United States Patent Office 3,497,805
Patented Feb. 24, 1970

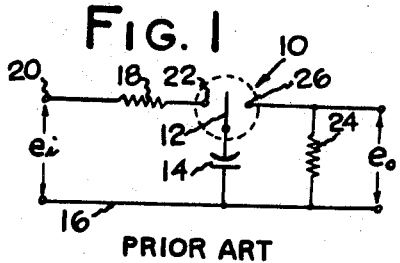
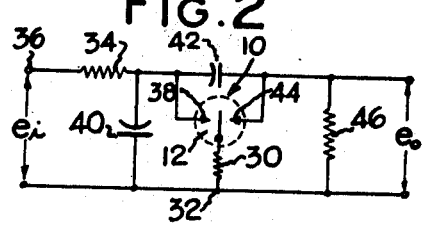
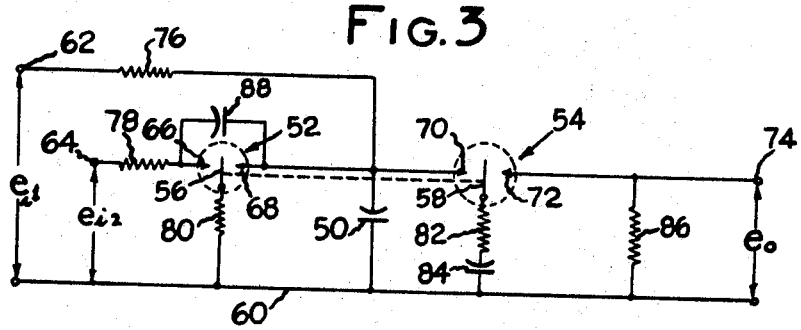
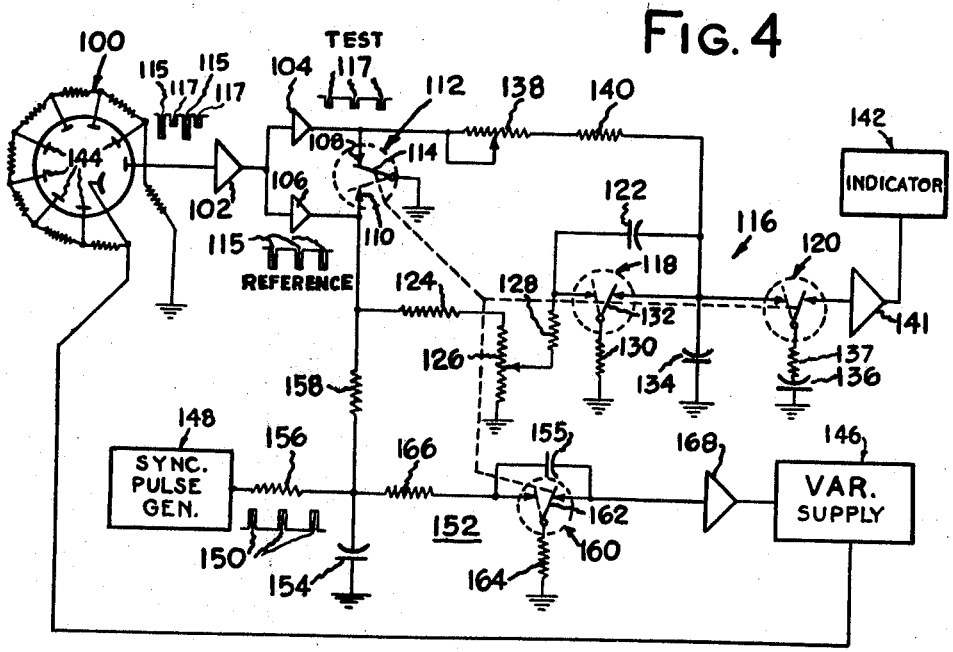
INVENTOR.
HAROLD G. CAMNITZ

3,497,805
CIRCUIT INCLUDING A CONSTANT AMPLITUDE PULSE GENERATOR FOR ADJUSTING THE AMPLITUDE OF PULSES PRODUCED BY A TRANSDUCER
Harold G. Cammitz, East Aurora, N.Y., assignor, by mesne assignments, to Bausch and Lomb, Inc., a corporation of New York
Original application Feb. 18, 1960, Ser. No. 9,570, now Patent No. 3,234,408, dated Feb. 8, 1966. Divided and this application Dec. 2, 1964, Ser. No. 415,263
Int. Cl. G01r 7/00
U.S. Cl. 324—140        2 Claims

ABSTRACT OF THE DISCLOSURE

Pulses produced by a condition responsive transducer such as a photomultiplier are compared with pulses produced by a constant amplitude pulse generator, which is operated synchronously with the transducer. The comparison yields an error signal, which is amplified and used to modulate the transducer in a direction to minimize the error signal.

---

This application is a division of my copending application, Ser. No. 9,570, filed Feb. 18, 1960, entitled Electrical Circuit Including One Or More Commutating Switches, and now Patent No. 3,234,408, granted Feb. 8, 1966.

This invention relates to an improved electrical circuit including one or more commutating switches, and more particularly, but not exclusively, to a circuit of this type arranged for receiving an information signal, discriminating against unwanted, or spurious portions of the signal, and transmitting wanted portions with minimum delay.

The present invention has special application to the problems of reducing the harmonic content of an electrical signal, and handling relatively complicated signals such as those having second and higher harmonic components of greater amplitude than the fundamental component to produce a signal indicative of the value of the fundamental component and having second and higher harmonic components of relatively small value.

In certain types of electrical apparatus, variable gain transducers are employed for developing an electrical signal in response to an ambient, or external condition. Certain ones of these transducers such as, for example, photomultiplier tubes exhibit relatively large changes in sensitivity as a function of the condition they sense, and it is often desirable, in order to achieve maximum utilization, to provide circuit means for varying the transducer gain in inverse proportion to the changes of its sensitivity caused by changes in the condition being sensed, thereby to compensate the output signal of the transducer. This can be done by periodically exposing the transducer to a controlled, or reference condition corresponding in terms of the transducer's sensitivity to the unknown condition under examination, and adjusting the transducer gain to bring its output signal in response to the reference condition to a predetermined value. This general concept as applied to a spectrophotometer is disclosed by Dimmick in U.S. Patent #2,474,098.

The period exposure of the transducer alternately to a reference condition and to a condition to be measured causes the transducer output to be in the form of a series of electrical pulses. The present invention provides improved means for filtering such a signal to remove unwanted and spurious portions therefrom and to reduce their second and higher order harmonic contents, and for measuring the pulses with a relatively high degree of accuracy.

Accordingly, one important object of the present invention is to provide an improved electrical circuit responsive to an electrical signal composed of time spaced pulses.

Other objects of the invention are: to provide an improved electrical circuit for filtering an electrical signal and reducing the harmonic components thereof; to provide an improved electrical filter circuit having an output responsive to relatively low frequency signal variations and capable of extremely high discrimination against higher frequency signal variations including the second and third harmonics of the fundamental frequency of the desired signal, yet having a relatively short delay characteristic; to provide an improved electrical circuit for measuring electrical pulses of the type that occur during preselected periods the duration of which is subject to limited variation; to provide in an electrical circuit of the type having switching means for alternately opening and closing a circuit portion, improved means for producing an output signal indicative of the average value of a selected characteristic of that portion of an input signal which occurs during times when the circuit portion is closed; to provide an improved low pass electrical filter circuit capable of relatively high discrimination between wanted and unwanted portions of a signal, and capable of transferring the wanted portion of the signal from an input to an output circuit with minimum delay; to provide an improved filter circuit for simultaneously removing unwanted portions from a signal composed of time spaced pulses, and for comparing the relative values of successive ones of the pulses; and, in general, to provide an improved electrical circuit of this type which is of relatively simple and inexpensive construction, and reliable and accurate in operation.

The foregoing and other objects and advantages of the invention will become apparent in the following detailed description of representative embodiments thereof, taken in conjunction with the drawing wherein:

FIGURE 1 is a schematic diagram of a filter circuit according to the prior art;

FIGURE 2 is a schematic diagram of a filter according to a first embodiment of the present invention;

FIGURE 3 is a schematic diagram of a filter circuit according to a second embodiment of the invention and having two input circuits; and FIGURE 4 is a schematic diagram, partly in block diagram form, of a condition responsive circuit according to the present invention such as may be used, for example, in a spectrophotometer.

Briefly, the invention contemplates an electrical circuit including a first capacitor for receiving and storing an electrical charge, switching means for alternately connecting the capacitor to input and output portions, respectively, of the circuit, an auxiliary capacitor, and switching means for alternately connecting the auxiliary capacitor in parallel with the first capacitor and discharging the auxiliary capacitor through a circuit portion separate from the output portion. The use of an auxiliary capacitor is essential to the achievement of the superior operatnig characteristics of the circuits of the present invention, because it permits the circuits to be designed with relatively long time constants in both their input and output portions without introducing undesirable delay in their signal transmission characteristics.

That part of the invention having to do with filtering the signal will be discussed first in connection with FIGURES 1, 2, and 3 of the drawing. The prior art, three terminal circuit illustrated in FIGURE 1 includes a commutating switch 10, of the break-before-make type, which is capable of relatively rapid repetitive operation, and which may be of any desired type such as the so-called "chopper" type illustrated. The switch 10 is a single pole, double throw switch, and may be provided with any desired means (not shown) for operating it at a desired switching rate, which will usually be selected in view of the nature of the input signal $E_i$. The movable contact 12 of the switch is conected to one plate of a capacitor 14, the other plate of which is connected to the common terminal 16 of the circuit. The input signal $E_i$ is applied between an independent input terminal 20 and the common terminal 16. An input resistor 18 is connected between the independent input terminal 20 and one fixed contact 22 of the switch. The output signal $E_o$ is developed across the output resistor 24, which is connected between the other fixed contact 26 of the switch and the common terminal 16.

The capacitor 14 may be termed the transfer capacitor, since it is the signal storage element associated with the transfer of the desired signal information from the input circuit to the output. The capacitor 14 is charged by the input signal $E_i$ through the input resistor 18 during the dwell time of the movable contact 12 upon the first fixed contact 22. When thereafter the movable contact 12 moves to the second fixed contact 26, the capacitor 14 discharges through the output resistor 24, developing a voltage thereacross proportional to the charge previously received by the capacitor 14 from the input signal $E_i$.

This circuit operates as a low pass filter, rejecting, or filtering out spurious or unwantd signals the frequency of which is higher than the switching frequency. For optimum operation, however, the circuit presents serious disadvantages. For minimum time delay between the occurrence of a change in the input signal $E_i$ and the occurence of a corresponding change in the output signal $E_o$, the time constant of either the input or the output portion of the circuit must be short compared to the switching period, that is, either the time constant of the input resistor 18 in series with the capacitor 14, or the time constant of the output resistor 24 in series with the capacitor 14 must be short relative to the switching period. If the input time constant is less than the switching period, and the output time constant is much greater than the switching period, the magnitude of the output signal will not be proportional to the average value of the input signal, but will tend to be proportional to the instantaneous values of the input signal at the moments when the movable contact 12 becomes disengaged from the first fixed contact 22. This disadvantage may be overcome, and the time delay still minimized by making the input time constant much greater than the switching period and the output time constant less than the switching period, but in this case the output wave form will be poor due to differentiation. If both the input and the output time constants are made much greater than the switching period, the filter will have a relatively long delay characteristic.

It is thus apparent that the prior art filter illustrated in FIG. 1 is restricted and limited in use, since it is not possible to obtain minimum delay, and proper signal averaging for maximum signal-to-noise ratio, together with a desirabel output signal form.

According to the invention, these disadvantages and limitations are effectively overcome, and a filter circuit is provided having the advantages of: substantially completely isolating the output circuit from the input circuit; providing an output signal having a so-called "clean" wave form with relatively low harmonic content; providing an output signal which is a linear function of the input signal; providing an output signal which varies in response to the input signal with minimum delay; and providing an output signal which is equally responsive to all portions of the input signal.

One circuit according to the invention is shown in FIG. 2, and includes a single pole, double throw commutating switch 10, the movable contact 12 of which is connected through a shorting resistor 30 to the common terminal 32 of the circuit. An input resistor 34 is connected between the independent input terminal 36 and the first fixed contact 38 of the switch. An input capacitor 40 is connected between the first fixed contact 38 and the common terminal 32. A transfer capacitor 42 is connected between the first and second fixed contacts 38 and 44, respectively, of the switch. The output signal $E_o$ is developed across an output resistor 46, which is connected between the second fixed contact 44 of the switch and the common terminal 32. The shorting resistor 30 serves to limit contact currents in the switch 10, and should be made as large as possible without interfering with the signal handling characteristics of the circuit. A practical upper limiting value for the shorting resistor 30 is the switching period, that is, the duration of one cycle in the operation of the switch 10 divided by twenty times the value of the transfer capacitor 42.

In operation, the input signal $E_i$ charges both the input capacitor 40 and the transfer capacitor 42 (in parallel) through the input resistor 34 during that portion of the switching cycle in which the movable contact 12 is in engagement with the second fixed contact 44, that is, to the right as shown in FIGURE 2. When the movable contact 12 moves to the left into engagement with the first fixed contact 38, the input capacitor 40 is rapidly discharged through the shorting resistor 30, and the transfer capacitor 42 is connected across the output resistor 46, thereby developing an output voltage $E_o$ which varies in magnitude according to the charge received by the transfer capacitor 42 from the input signal $E_i$.

In this circuit, the effective input time constant is the product of the value of the input resistor 34 and the sum of the values of the input capacitor 40 and the transfer capacitor 42. (The shorting resistor 30 is of small value and has negligible effect on the time constant.) This time constant is preferably made much greater than the period of the switch 10. The effective output time constant is the product of the values of the output resistor 46 and the transfer capacitor 42, and is also preferably made much greater than the period of the switch 10. In addition, the transfer capacitor 42 is preferably of much smaller value than the input capacitor 40.

The input capacitor 40 is discharged through a circuit separate from the output circuit during each switching cycle when the movable contact 12 of the switch engages the first fixed contact 38. Accordingly, the circuit does not tend to integrate the input signal $E_i$ over more than one cycle, except to the relatively small extent that a portion of the charge stored and remaining in the transfer capacitor 42 is returned to the input capacitor 40 when the movable contact 12 comes into engagement with the second fixed contact 44. If the input capacitor 40 is much larger than the transfer capacitor 42, this effect will be negligible.

The input time constant as hereinabove stated is much larger than the period of the switch 10, and the input circuit fully averages, or integrates the input signal $E_i$ over the full half cycle sampling period, that is, over the entire time that the movable contact 12 is away from the first fixed contact 38. In this way the circuit provides equal significance, or weighting in the output signal $E_o$ for all parts of the input signal $E_i$ during the sampling period.

The output wave form is also of a desirable rectangular, or square wave characteristic, because the output time constant is relatively large. The transfer capacitor 42 does not lose any substantial portion of its charge through the output resistor 46 during the dwell time of the movable contact 12 in its left-hand position in engagement with the first fixed contact 38.

The delay characteristic of the filter is approximately equal to one-half of the period of the switch 10. Any delay in excess of this time is minimized by making the value of the transfer capacitor 42 small relative to the value of the input capacitor 40. If the transfer capacitor 42 is made larger, the filtering action of the circuit will also be increased, that is, the filter will discriminate against relatively lower frequency components of the signal, but at the cost of some increase in delay. For practical purposes, minimum delay may be achieved by making the capacity of the transfer capacitor 42 less than one-quarter of the capacity of the input capacitor 40. Where minimum delay is not of critical importance, and where maximum filter action is desired, the transfer capacitor may be relatively larger.

A circuit according to a second embodiment of the invention is illustrated in FIGURE 3. This circuit is arranged for developing a signal indicative of the differences between the values of the integrals of the potentials with respect to time of two signals $E_{11}$ and $E_{12}$ taken over selected periods of time. The circuit includes an auxiliary capacitor 50, which is periodically discharged during the operation of the circuit. The auxiliary capacitor 50 is connected on the input side of the circuit with respect to the first signal $E_{11}$, and on the output side with respect to the second signal $E_{12}$. It functions similarly to the input capacitor 40 shown in the circuit illustrated in FIGURE 2, and permits the use of relatively long time constants without introducing undesired delay in the response of the output signal $E_o$ to the input signals $E_{11}$ and $E_{12}$.

The circuit illustrated in FIGURE 3 includes two single pole-double throw commutating switches 52 and 54, respectively, which are operated synchronously with each other and in the same sense, that is, both of the movable contacts 56 and 58 of the respective switches move to the left at the same time and thereafter move to the right at the same time. The switches 52 and 54 are connected in a network for alternately sensing the two input signals $E_{11}$ and $E_{12}$ on a time sequential basis, comparing the signals so sensed, and producing an output signal $E_o$ representative of the difference between the integrals of the potentials of the sensed portions of the two input signals $E_{11}$ and $E_{12}$.

The first input signal $E_{11}$ is applied between the common terminal 60 of the circuit and the first input terminal 62. The second input signal $E_{12}$ is applied between the common terminal 60 and the second input terminal 64. The fixed contacts 66, 68, 70, and 72 of the commutating switches are arranged in series between the second input terminal 64 and the independent output terminal 74, the right hand fixed contact 68 of the first switch 52 being directly connected to the left hand contact 70 of the second switch 54. The auxiliary capacitor 50 is connected between the fixed contacts 68 and 70 and the common terminal 60 of the circuit. The first input terminal 62 is connected to the fixed contacts 68 and 70 through a first input resistor 76, and the second input terminal 64 is connected through a second input resistor 78 to the left hand fixed contact 66 of the first switch.

The movable contact 56 of the first switch is connected to the common terminal 60 through a shorting resistor 80, which is preferably of relatively small value, and which serves principally to limit the contact currents in the switch. The movable contact 58 of the second switch is connected to the common terminal 60 through the transfer capacitor 84 in series with a current limiting resistor 82 of relatively small value. The output resistor 86 is connected between the second fixed contact 72 of the second switch and the common terminal 60.

In operation of the circuit, when the movable contacts 56 and 58 are to the left, that is, in engagement with their respective first fixed contacts 66 and 70, the second input signal $E_{12}$ is impressed across the input resistor 78 in series with the shorting resistor 80, and has substantially no effect upon other parts of the circuit since the shorting resistor 80 is much smaller than the second input resistor 78. During this time, the first input signal $E_{11}$ charges the three capacitors 50, 84, and 88, which are in series with the first input resistor 76 and in parallel with each other. The time constant of this input circuit, which is the value of the first input resistor 76 multiplied by the sum of the values of the three capacitors 50, 84, and 88 is made much larger than the period of the switches so that the charge accumulated by the capacitors 50, 84, and 88 is proportional to the integral of the first input signal $E_{11}$ taken over the entire dwell time of the switches 52 and 54 in their left hand position.

When, now, the movable contacts 56 and 58 move to the right, the charge on the transfer capacitor 84 is applied across the output resistor 86 to develop an output signal; the auxiliary capacitor 50 is relatively rapidly discharged through the current limiting resistor 80; and the second input signal $E_{12}$ charges the second input capacitor 88, which is connected directly across the fixed contacts 66 and 68 of the first switch. It may be noted here that the polarity of the second input capacitor 88 with respect to the second input signal $E_{12}$ is opposite from its polarity with respect to the first input signal $_{11}$ and when the two input signals are of the same polarity with respect to the common input terminal 60, they charge the capacitor 88 in opposite directions.

When the movable contacts 56 and 58 return to the left-hand position, the charge accumulated by the second input capacitor 88 is distributed among all three capacitors, the transfer capacitor 84, the auxiliary capacitor 50, and the second input capacitor 88.

The input time constant for the second input signal $E_{12}$ is the product of the value of the second input resistor 78 and the second input capacitor 88, and this time constant is made large relative to the period of the switches so that the charge accumulated by the second input capacitor 88 during the dwell time of the movable contacts 56 and 58 in their right hand position is proportional to the integral of the second input signal $E_{12}$ over the entire dwell period. The charge so accumulated is distributed among all three capacitors when the movable contacts 56 and 58 return to the left hand position. The first input signal then again charges the three capacitors 88, 50, and 84 in parallel. The resulting charge on the three capacitors 50, 84, and 88 at the end of the left hand dwell period of the movable contacts 56 and 58 represents the difference between the integral of the first input signal $E_i$ over one-half period of the switching cycle and a predetermined fraction of the integral of the second input signal $E_{12}$ over the immediately preceding half period of the switching cycle. The potential produced across the transfer capacitor 84 by this charge is transferred to the output resistor 86 to produce an output voltage signal thereacorss.

In the event the time constants of the two input circuits are made equal to each other, the circuit will provide greater weighting for the first input signal $E_{11}$ than for the second signal $E_{12}$, according to the relative values of the three capacitors 88, 50, and 84. This may readily be compensated for by attenuating the first input signal $E_{11}$ by any desired means (not shown) such as by a voltage divider network.

If it is desired to minimize the delay characteristic, the value of the auxiliary capacitor 50 should be made large relative to the sum of the values of the transfer capacitor 84 and the second input capacitor 88, and thus, the charge remaining on the transfer capacitor 84 when the movable contacts 56 and 58 return to the left hand position is relatively small, and has relatively little effect in recharging the auxiliary capacictor 50 and the second input capacitor 88. In practice, if it is desired to minimize the delay, the value of the auxiliary capacitor 50 should be at least four times the sum of the values of the transfer capacitor 84 and the second input capacitor 88.

The value of the transfer capacitor 84 will have a lower limit, however, in view of the type of output signal it is desired to provide. If a relatively smooth rectangular wave form is desired in the output circuit, the output time constant (the product of the values of the output resistor 86 and the transfer capacitor 84) is preferably made much greater than the period of the switches.

The voltage resulting from the transfer of the second input signal charge from the capacitor 88 to the three input capacitors in parallel depends upon the value of the second input capacitor 88 relative to the value of the auxiliary capacictor 50. If it is desired to maximize the resulting voltage, the second input capacitor should be large relative to the sum of the values of the auxiliary capacitor 50 and the transfer capacitor 84, although this involves some increase in the delay characteristic of the network.

The circuits according to the invention are advantageous for use in many different applications, and are capable of accomplishing several different functions. For example, the circuit illustrated in FIGURE 2 may be used as a low pass filter having a relatively sharp cut-off characteristic such that it will pass all signal variations below a given frequency substantially without discrimination, yet will substantially completely eliminate signal variations of frequencies as low as the second harmonic of the given frequency. It may also be used as a polarity reversing circuit for reversing the polarity of a signal.

The circuit illustrated in FIGURE 3 may be used for comparing any two electrical signals with respect to the integrals of the sampled portions thereof, or for adding two signals and producing an output signal indicative of the sum of the integrals of the sampled portions of the two signals, instead of the difference between them. Also, by appropriate phasing of the commutating switches 52 and 54, relative to the input signals the circuit may be used for producing an output signal indicative of the phase relationship between two input signals.

The circuits shown separately in FIGURES 2 and 3 are both incorporated in the relatively complex measuring circuit shown in FIGURE 4, which as illustrated is especially suited for use in a measuring instrument such as, for example, a spectrophotometer. In this circuit, electrical signals are generated by a condition responsive transducer such as the photomultiplier vacuum tube 100 illustrated, and are fed to a preamplifier 102. The output of the preamplifier 102 is connected with the inputs of two separate amplifiers, 104 and 106 respectively.

In one type of spectrophotometer, light is received by the photomultiplier tube 100 in pulses alternately from a reference source, and from a test source, which is to be examined by comparison with the reference source. The photomultiplier 100 thus produces an electrical signal consisting of a series of time spaced pulses, alternate ones of which are responsive respectively to the condition of the reference source and to the condition of the test source. The circuit is arranged for comparing the relative values of the signal pulses generated responsively to the condition of the reference source with the pulses generated responsively to the condition of the test source in order to obtain a measure of the characteristics of the test source relative to the reference source.

The electrical signal generated by the photomultiplier 100 is amplified by the preamplifier 102 and by the two amplifiers 104 and 106. The respective outputs of the two amplifiers 104 and 106 are connected to the opposite fixed terminals 108 and 110 respectively of a commutating switch 112, the movable contact 114 of which is directly connected to a point of reference potential hereinafter referred to as ground. The movable contact 114 is operated synchronously with the signal pulses developed by the photomultiplier 100, and is preferably arranged so that the dwell time of the movable contact 114 at each one of the fixed contacts 108 and 110 is longer than the duration of one of the signal pulses. For example, if the signal pulses 115 and 117, which are illustrated in idealized form each have a duration of about $\frac{1}{240}$ of a second and are spaced about $\frac{1}{240}$ of a second apart in time, the dwell time of the movable contact 114 is preferably made as close to 120th of a second as possible in order to insure that one entire signal pulse will occur during each dwell time of the movable contact 114 despite variations in operating conditions.

The switch 112 is operated in the illustrated circuit to separate the signal pulses responsive to the reference condition from the signal pulses responsive to the test condition so that they may be compared. For purposes of convenient illustration and discussion it will be assumed that the relatively large amplitude signal pulses 115 illustrated schematically in the drawing are the pulses (hereinafter referred to as the reference pulses) generated in response to the reference condition, and the relatively small amplitude pulses 117 are the pulses (hereinafter referred to as the test pulses) generated in response to the test condition.

The synchronization of the switch 112 is such that the output of the first amplifier 104 is directly connected to ground during times when the reference pulses 115 appear at the amplifier output. The reference pulses 115 are thus eliminated from the voltage output of the first amplifier 104. Similarly, during times when the test pulses 117 are amplified in the two amplifiers 104 and 106, the movable contact 114 of the switch is in engagement with the second fixed contact 110 thereby shorting the output of the second amplifier 106 to ground so that its voltage output is not responsive to the test pulses.

The outputs of the two amplifiers 104 and 106 are fed separately to the comparison circuit 116, which is generally similar to the circuit illustrated in FIG. 3, and includes two commutating switches 118 and 120 operated synchronously with the first commutating switch 112. During the times when the switches 112, 118, and 120 are in the positions shown in solid lines, the reference pulses are amplified by the second amplifier 106, and the output of the second amplifier 106 charges the input capacitor 122 through a fixed attenuating resistor 124, a variable attenuating resistor 126, and the first input resistor 128. The shorting resistor 130 connected between the movable contact 132 of the commutating switch 118 and ground is of relatively small value and serves to limit the contact currents in the switch 118. This resistor 130 is of negligible value with respect to the signal charging circuit of the input capactor 122.

When the switches 112, 118, and 120 are reversed in position, the charge on the input capacitor 122 is partly transferred to the auxiliary capacitor 134 and to the transfer capacitor 136, being distributed among the three capacitors 122, 134, and 136, and during the dwell time of the switches 112, 118, and 120 in their reversed positions, as shown in dashed lines the test pulses occur and are amplified by the first amplifier 104. The output of the first amplifier 104 during these periods charges the three capacitors 122, 134, and 136 in parallel (in the opposite direction from the second amplifier output) through an attenuating resistor 138 and an input resistor 140.

The charge placed on the auxiliary capacitors 134 and on the transfer capacitor 136 in response to the reference pulses 115 is of opposite polarity from the polarity of the pulses themselves. This comes about through the action of the input capacitor 122, while operates as a polarity reversing device. Thus, even though both the reference pulses 115 and the test pulses 117 are of the same polarity at the outputs of the two amplifiers 104 and 106, they are compared in an opposite sense, and when their average voltages are equal a predetermined voltage appears across the transfer capacitor 136 depending upon the various circuit parameters. The circuit parameters may be adjusted to attenuate the test pulses 117 to provide for no voltage across the transfer capacitor 136 when the amplitudes of the reference pulses 115 and the test pulses 117 are equal. In this case, the voltage developed across the transfer capacitor 136 will be directly proportional to the difference between the average voltages of the reference pulses and the test pulses, respectively.

Upon the return of the commutating switches 112, 118, and 120 to their positions shown in solid lines, the charge on the transfer capacitor 136 is applied to the final amplifier 141, the output of which may be directed to any desired type of indicating device 142.

The sensitivity of certain transducers such as, for example, the photomultiplier tube 100 illustrated is a function of the condition being sensed, and it is often desired to vary the gain of the transducer to compensate for changes in sensitivity, thereby to provide a more uniform response throughout its useful range. Means are included in the present circuit for adjusting the gain of the photomultiplier tube 100 to compensate for changes in its sensitivity. The dynodes 144 of the photomultiplier are connected to a variable high voltage electrical power supply 146, and the gain of the photomultiplier 100 varies in response to changes in the output voltage of the supply 146.

The circuit is arranged to control the power supply 146 in response to relatively small changes in the amplitude of the reference pulses 115, and thereby to maintain the reference pulses at a substantially constant amplitude. The output of the second amplifier 106, which comprises only the reference pulses 115 is compared with the output of a standard pulse generator 148, which operates synchronously with the commutating switches 112, 118, and 120 and with the other portions of the apparatus (not shown) which time the generation of the reference pulses 115. The pulses 150 generated by the pulse generator 148 are of uniform amplitude, and of opposite polarity from the reference pulses 115 at the output of the second amplifier 106. The generated pulses 150 occur approximately simultaneously with the reference pulses 115, and both of the pulses 115 and 150 are fed to the comparison circuit 152, which filters the signal and develops an output for controlling the power supply 146.

The reference pulses 115 from the second amplifier 106 charge the input capacitor 154 in one sense through an input resistor 158, and the generated pulses 150, being of opposite polarity charge the capacitor 154 in the opposite sense through another input resistor 156. If the time integral of the voltages of the pulses 115 and 150 are equal, the effects of the two pulses are equal and opposite and no charge is accumulated in the input capacitor 154 or the transfer capacitor 155. The commutating switch 160 is operated synchronously with the other parts of the circuit including the commutating switches 112, 118, and 120. During the periods when the reference pulses 115 and the generated pulses 150 occur, the movable contact 162 of the switch is in its right hand position, as illustrated, so that the transfer capacitor 155 is connected in parallel with the input capacitor 154 through the relatively small value shorting resistor 164 and an additional current limiting resistor 166, which is included in this circuit for limiting the discharge current of the input capacitor 154 through the commutating switch 162. The limiting resistor 166 is of small value relative to the two input resistors 156 and 158 and has only a negligible effect on the signal handling characteristics of the circuit.

The voltage produced across the transfer capacitor 155 due to any difference between the averaged voltages of the reference pulses 115 and the generated pulses 150 is transferred to an amplifier 168 when the movable contact 162 of the switch moves from its right hand position as shown to its left hand position. The amplifier 168 is connected to control the output of the high voltage supply 146 thereby to vary the gain of the photomultiplier tube 100 in response to changes in amplitude of the reference pulses 115.

A relatively high degree of stability and relatively rapid and accurate response is achieved by using a specially generated pulse as a standard of comparison for the reference pulses 115 in the circuit. Since both of the pulses 115 and 150 are shorter than, and occur during the dwell time of the commutator switch, the amplitude of the output signal is completely independent of small, unavoidable variations in the length of the switch dwell time such as may be occasioned by changes in the ambient or other operating conditions.

The values of the various circuit elements in an actual embodiment of the circuit shown in FIGURE 4 that have been found to provide satisfactory operation are as follows:

| | |
|---|---|
| Output impedance of the amplifiers 104 & 106 | Less than about 100 ohms. |
| First input resistor 140 | 820,000 ohms. |
| Attenuating resistor 138 | 200,000 ohms. |
| Attenuating resistor 124 | 82,000 ohms. |
| Variable attenuating resistor 126 | 25,000 ohms. |
| First input resistor 128 | 2.2 megohms. |
| Shorting resistor 130 | 1,000 ohms. |
| Input capacitor 122 | .5 µfd. |
| Auxiliary capacitor 134 | .33 µfd. |
| Transfer capacitor 136 | .1 µfd. |
| The current limiting resistor 137 | 100 ohms. |
| Input impedance of the indicator amplifier 141 | 220,000 ohms. |
| Input resistor 158 | 560,000 ohms. |
| Input resistor 156 | 560,000 ohms. |
| Limiting resistor 166 | 5,600 ohms. |
| Input capacitor 154 | .25 µfd. |
| Shorting resistor 164 | 330 ohms. |
| Transfer capacitor 155 | .02 µfd. |
| Input impedance of the amplifier 168 | 3.2 megohms. |

Although the operation of the circuit shown in FIG. 4 has been described in connection with a pulse type signal, it should be clear that the circuit is not so limited, and may be used to advantage for handling signals of many different types. The circuits of the present invention are capable of handling a wide variety of signals where it is desired to discriminate against relatively high frequency signal components and to transfer signal information from an input circuit to an output circuit with minimum delay.

The practice of the invention is not limited to the use of any particular type of commutating switch. The term commutating switch as used in this application is meant to include any means for electrically connecting one circuit element to two other circuit elements alternately. Such means may be constituted by any of many different devices such as, for example, the hereinabove described choppers, electron or ion discharge tubes, solid state devices such as transistors, and rotating commutators.

What is claimed is:

1. Electrical apparatus of the type having a condition responsive transducer, means for alternately exposing the transducer to two selected conditions thereby causing it to produce an output signal composed of time spaced electrical pulses alternate ones of which are responsive respectively to the one and to the other selected condition, the transducer having a variable output characteristic responsive both to the selected conditions and to a voltage impressed upon it, and circuit means for producing an output signal indicative of the ratio between the values of the two selected conditions, the circuit means comprising:

means for comparing the respective alternate pulses produced by the transducer and for producing a sensible indication of the ratio between their values, means for producing a series of time spaced electrical pulses of substantially uniform value in predetermined timed relationship to those of the pulses produced by the transducer that are responsive to one of said selected conditions, means for comparing the values of said uniform pulses and those of the first mentioned pulses that are responsive to said one condition and producing an output voltage signal indicative of any difference therebetween, and means for adjusting the voltage applied to said transducer responsively to said output voltage signal in a direction to minimize said output voltage signal, thereby to cause the pulses produced by the transducer in response to said one condition to be of relatively uniform value thus to optimize the operation of said first mentioned comparing means.

2. Electrical apparatus of the type having a condition responsive transducer, means for alternately exposing the transducer to two selected conditions thereby causing it to produce an output signal composed of time spaced electrical pulses alternate ones of which are responsive respectively to the one and to the other selected condition, the transducer having a variable output characteristic responsive both to the selected conditions and to a voltage impressed upon it, and circuit means for producing an output signal indicative of the ratio between the values of the two selected conditions, the circuit means comprising:

means for comparing the respective alternate pulses produced by the transducer and for producing a sensible indication of the ratio between their values, means for producing a series of time spaced electrical pulses of substantially uniform value in predetermined timed relationship to those of the pulses produced by the transducer that are responsive to one of said selected conditions, means for comparing the values of said uniform pulses and those of the first mentioned pulses that are responsive to said one condition and producing an output voltage signal indicative of any difference therebetween, said last named means including a commutating switch having a dwell time longer than the duration of said uniform pulses, whereby relatively small variations in the dwell time of said switch do not affect said output voltage signal, and means for adjusting the voltage applied to said transducer responsively to said output voltage signal in a direction to minimize said output voltage signal, thereby to cause the pulses produced by the transducer in response to said one condition to be of relatively uniform value thus to optimize the operation of said first mentioned comparing means.

References Cited

UNITED STATES PATENTS

| | | | |
|---|---|---|---|
| 2,618,674 | 11/1952 | Stanton | 324—111 |
| 2,762,978 | 9/1956 | Norton | 324—140 |
| 2,992,428 | 7/1961 | White | 324—111 XR |
| 2,487,603 | 11/1949 | Scoles | 324—140 XR |
| 2,728,866 | 12/1955 | Edwards. | |
| 2,798,198 | 7/1957 | Dauphinee | 324—98 XR |
| 2,829,248 | 4/1958 | Oberbeck | 307—108 XR |
| 2,896,165 | 7/1959 | Hornig et al. | 324—140 |
| 2,992,428 | 7/1961 | White | 320—1 XR |
| 2,997,694 | 8/1961 | Thompson | 320—1 XR |
| 3,105,190 | 9/1963 | Norris | 324—6 |
| 3,131,349 | 4/1964 | Cary et al. | 324—140 |

GERARD R. STRECKER, Primary Examiner

U.S. Cl. X.R.

320—1; 342—98, 111; 328—175; 356—96